United States Patent
Wentworth et al.

(10) Patent No.: US 7,762,027 B1
(45) Date of Patent: Jul. 27, 2010

(54) SYSTEM FOR ATTACHING AN ARTICLE TO A ROOF AND METHOD OF USE

(76) Inventors: Stuart H. Wentworth, 108 Crest Ave., Alamo, CA (US) 94507-2646; Claudia H. Wentworth, 108 Crest Ave., Alamo, CA (US) 94507-2646

( * ) Notice: Subject to any disclaimer, the term of this patent is extended or adjusted under 35 U.S.C. 154(b) by 806 days.

(21) Appl. No.: 11/529,161

(22) Filed: Sep. 28, 2006

(51) Int. Cl.
*E04D 13/18* (2006.01)
*E04D 3/40* (2006.01)
*E04D 3/36* (2006.01)
*E04B 7/16* (2006.01)

(52) U.S. Cl. .............................. 52/173.3; 52/58; 52/410; 52/60; 126/621; 248/237

(58) Field of Classification Search ................ 52/173.3, 52/25, 58, 410, 60, 551; 126/621, 623; 136/244; 248/237, 500, 505
See application file for complete search history.

(56) References Cited

U.S. PATENT DOCUMENTS

| | | | | | |
|---|---|---|---|---|---|
| 1,709,376 | A | * | 4/1929 | Shirley | 52/459 |
| 3,735,543 | A | * | 5/1973 | Simon | 52/553 |
| 4,476,659 | A | * | 10/1984 | Player | 52/404.1 |
| 4,581,863 | A | * | 4/1986 | Thaler | 52/126.2 |
| 4,700,923 | A | * | 10/1987 | Lewis et al. | 248/679 |
| 4,890,432 | A | * | 1/1990 | Shepherd | 52/314 |
| 5,010,700 | A | * | 4/1991 | Blair | 52/199 |
| 5,056,750 | A | * | 10/1991 | Ellithorpe | 248/354.3 |
| 5,617,690 | A | * | 4/1997 | Gibbs | 52/518 |
| 5,642,596 | A | * | 7/1997 | Waddington | 52/546 |
| 5,746,029 | A | * | 5/1998 | Ullman | 52/27 |
| 5,873,201 | A | * | 2/1999 | Fey | 52/27 |
| 5,990,414 | A | * | 11/1999 | Posnansky | 136/244 |
| 6,052,961 | A | * | 4/2000 | Gibbs | 52/518 |
| 6,453,629 | B1 | * | 9/2002 | Nakazima et al. | 52/173.3 |
| 6,463,708 | B1 | * | 10/2002 | Anderson | 52/521 |
| 6,521,821 | B2 | * | 2/2003 | Makita et al. | 136/244 |
| 6,570,084 | B2 | * | 5/2003 | Dinwoodie | 136/251 |
| 6,584,737 | B1 | * | 7/2003 | Bradley, Jr. | 52/173.3 |
| 6,786,012 | B2 | * | 9/2004 | Bradley, Jr. | 52/173.3 |
| 6,883,290 | B2 | * | 4/2005 | Dinwoodie | 52/748.1 |
| 7,155,870 | B2 | * | 1/2007 | Almy | 52/544 |
| 7,168,215 | B1 | * | 1/2007 | Bednarczyk | 52/478 |
| 7,178,295 | B2 | * | 2/2007 | Dinwoodie | 52/173.3 |
| 7,677,522 | B2 | * | 3/2010 | Bakos | 248/500 |
| 2003/0154666 | A1 | * | 8/2003 | Dinwoodie | 52/173.3 |
| 2006/0156648 | A1 | * | 7/2006 | Thompson et al. | 52/173.3 |

* cited by examiner

*Primary Examiner*—Brian E Glessner
*Assistant Examiner*—Jason Holloway
(74) *Attorney, Agent, or Firm*—Ted Masters

(57) ABSTRACT

A system for attaching an article to a roof having shingles disposed on top of a structural member includes a flashing member which is rotatably connected to a stanchion. The flashing member includes a sheet of flashing which is slid up under one or more shingles. A hole is drilled through the shingles and into the structural member. The stanchion is then bolted to the structural member.

3 Claims, 9 Drawing Sheets

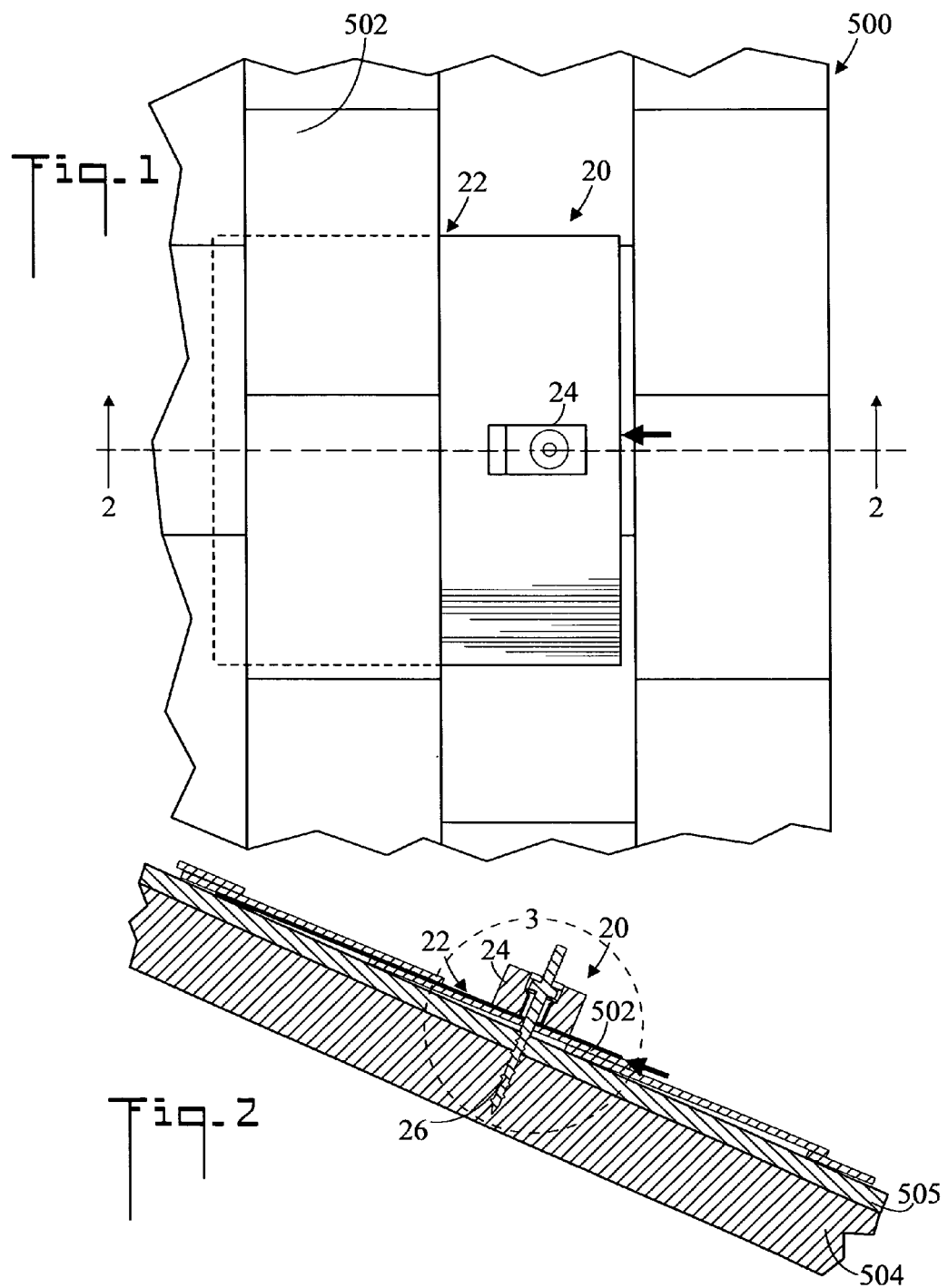

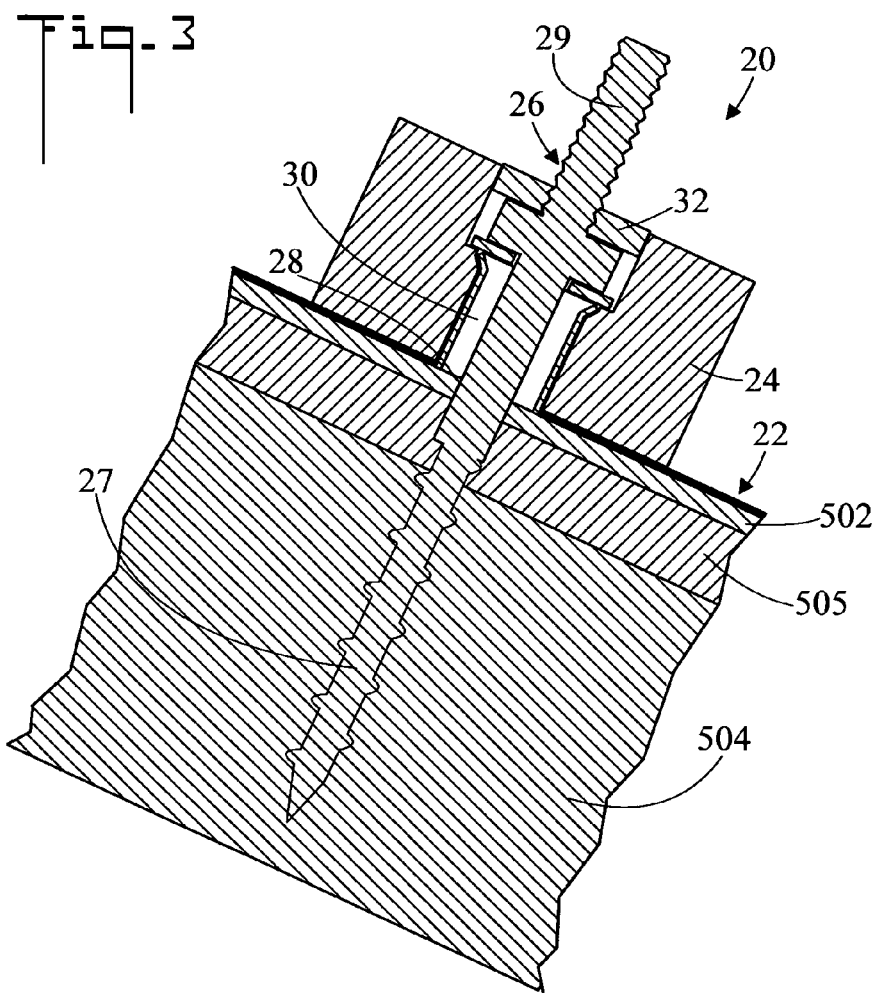

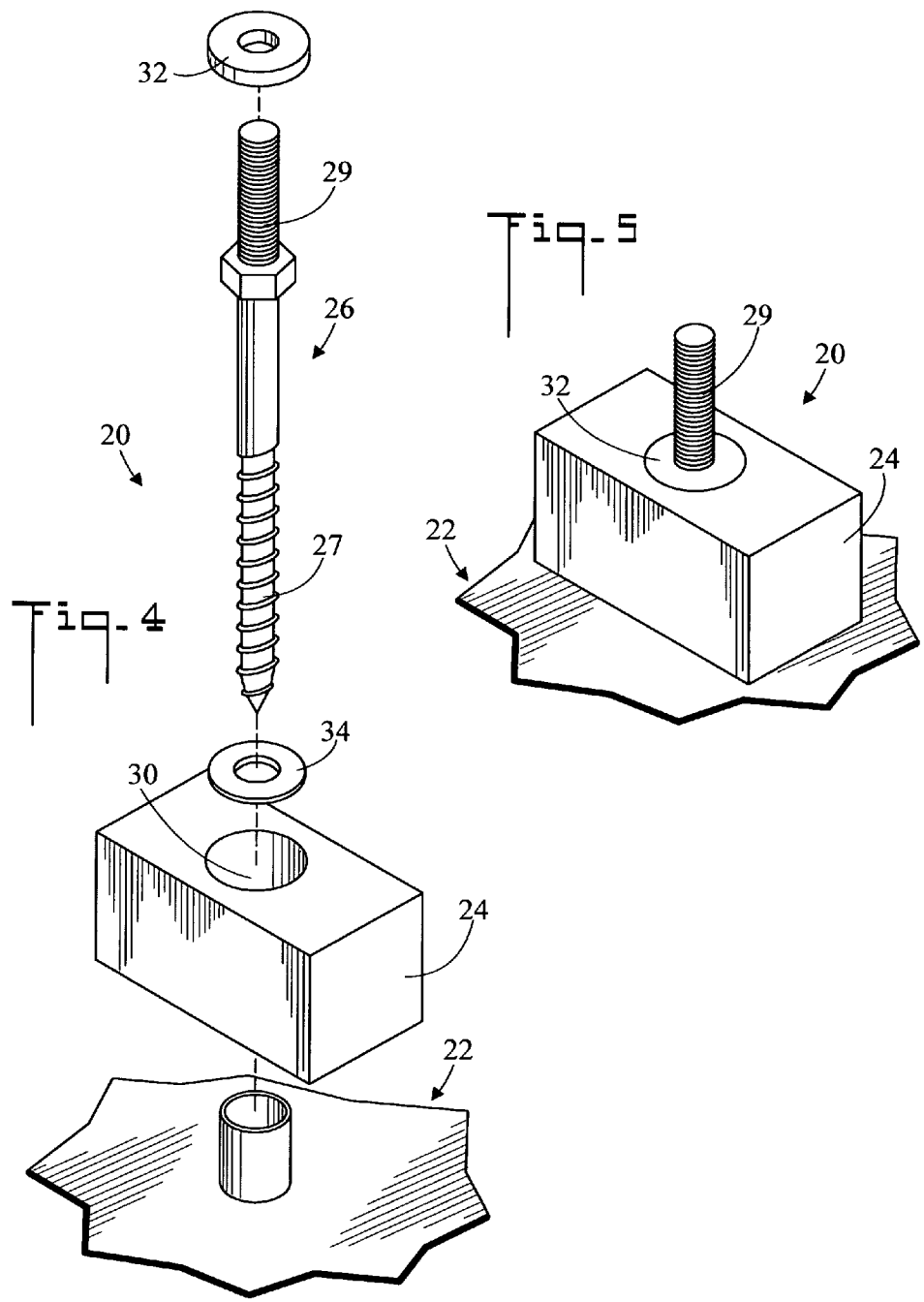

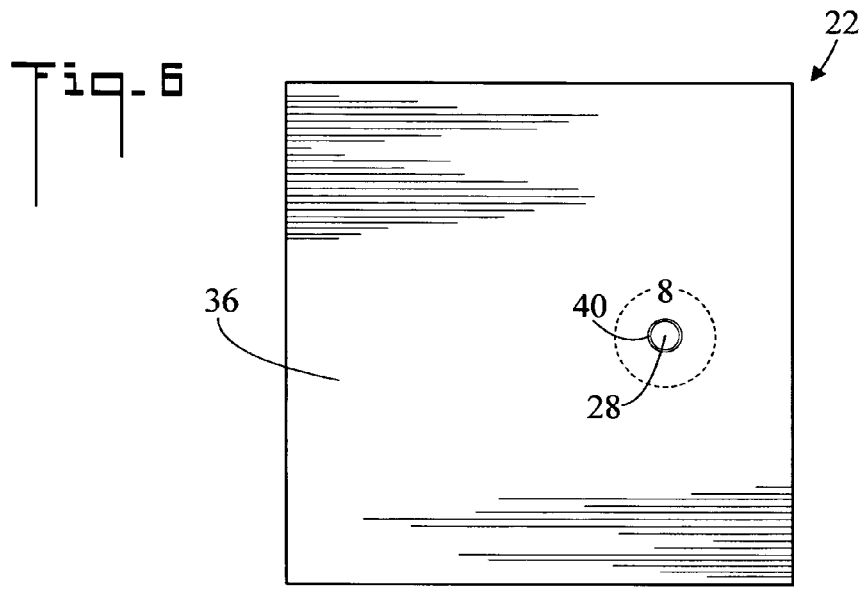
Fig_6
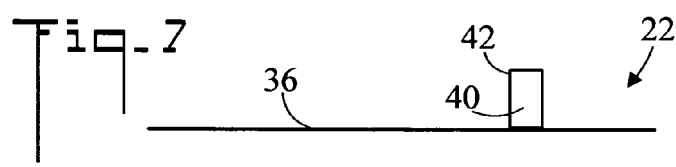
Fig_7
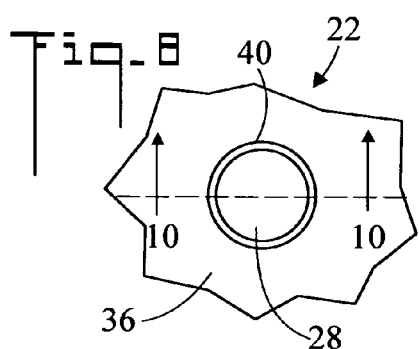
Fig_8
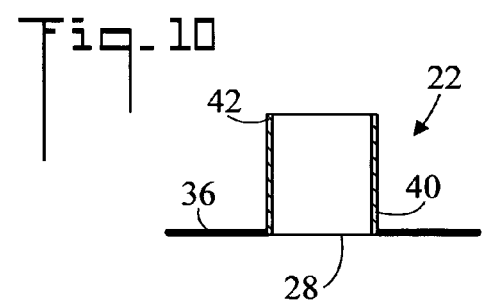
Fig_10
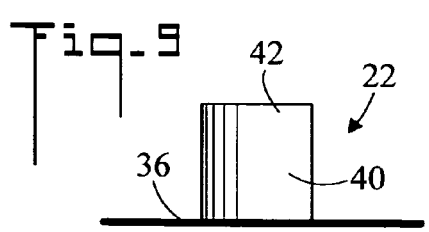
Fig_9
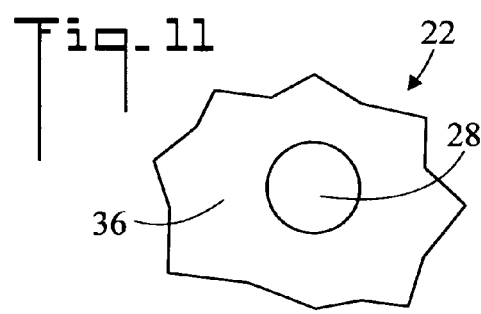
Fig_11

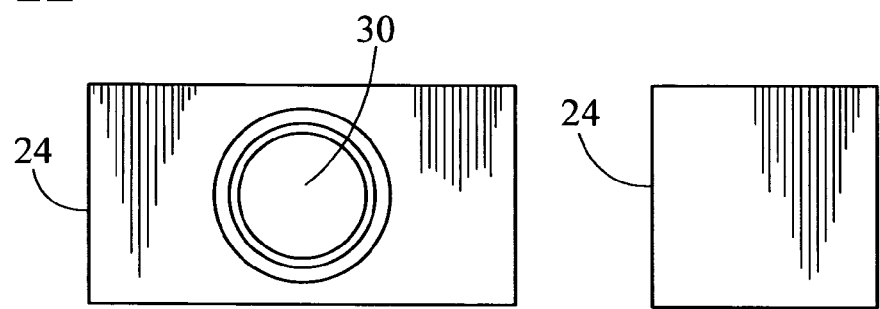
Fig. 12
Fig. 15
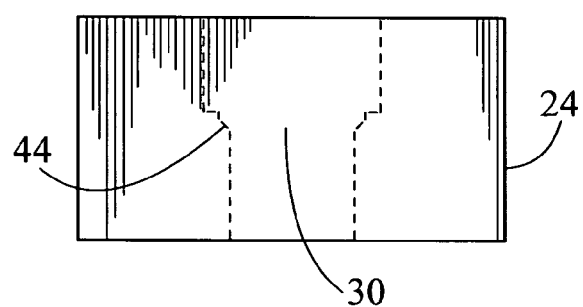
Fig. 13
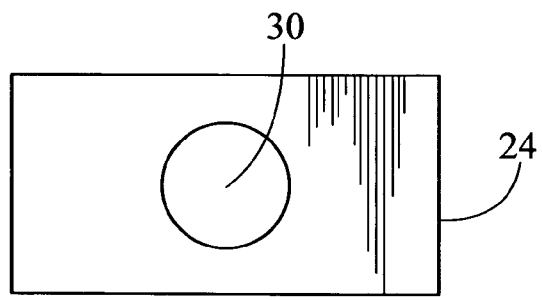
Fig. 14

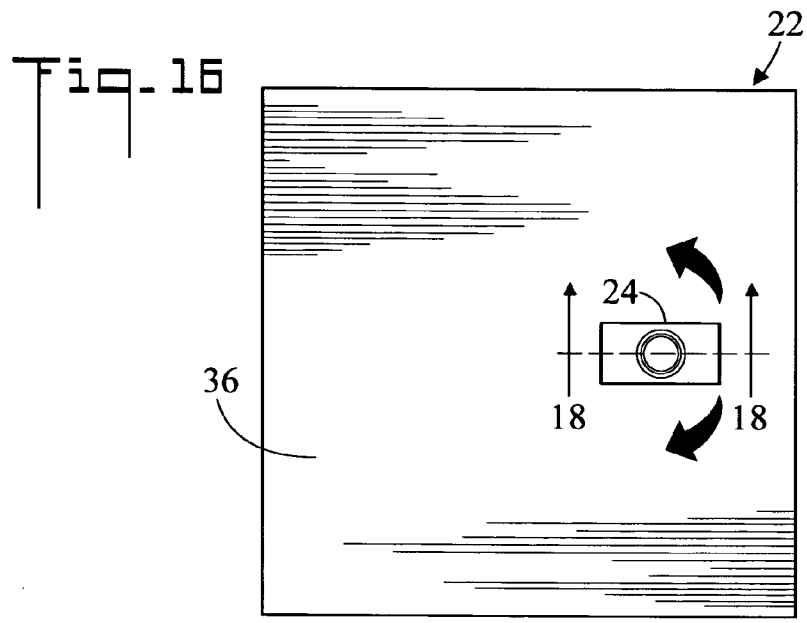
Fig_16
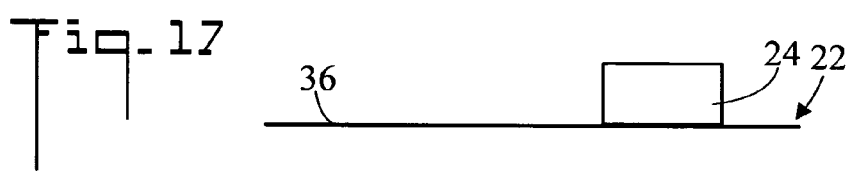
Fig_17
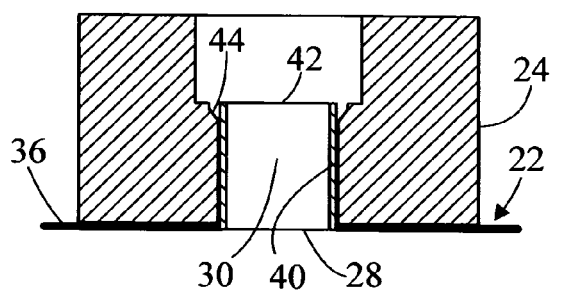
Fig_18
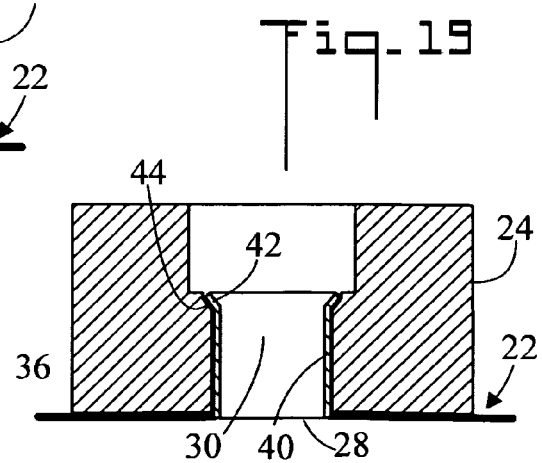
Fig_19

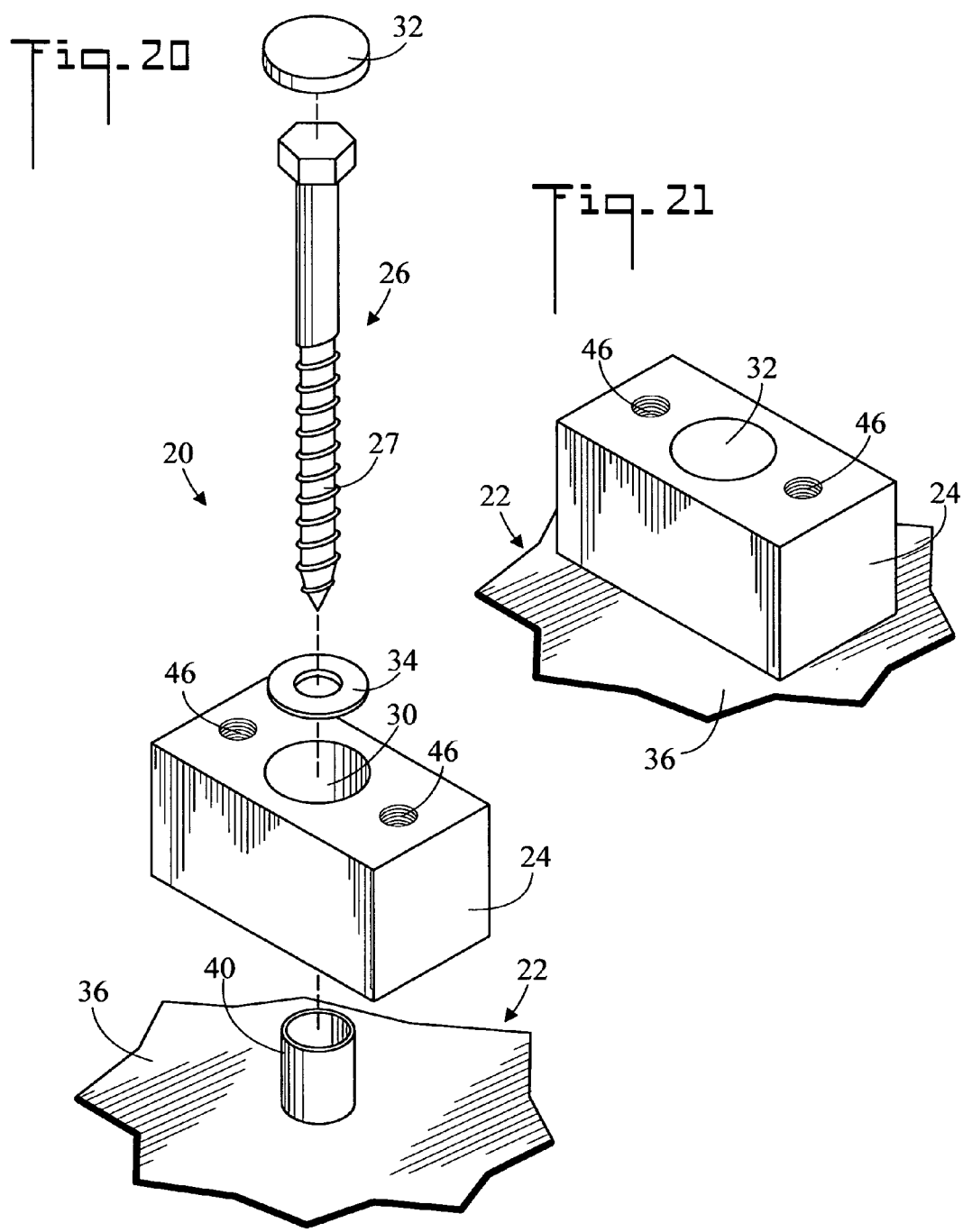

US 7,762,027 B1

SYSTEM FOR ATTACHING AN ARTICLE TO A ROOF AND METHOD OF USE

TECHNICAL FIELD

The present invention pertains to attaching articles such as photovoltaic panels to the roof of a structure, and more particularly to a system which is installed on the roof to serve as an anchor for the articles.

BACKGROUND OF THE INVENTION

On occasion it is necessary to attach articles to the roof of a structure. Such articles can include photovoltaic panels (solar panels), communication antennae, air conditioning equipment, heating equipment, and the like. The attachment is usually implemented by installing anchor devices on the roof, so that the article may be connected to the anchor devices. The anchor devices must necessarily penetrate the roof covering (such as shingles) and attach to a roof structural member such as a rafter. To minimize the possibility of water leaks, it is desirable to both minimize the number of roof penetrations and to ensure that the penetrations are water tight.

BRIEF SUMMARY OF THE INVENTION

The present invention is directed to a system for attaching articles such as photovoltaic panels to a roof having shingles disposed on top of a structural member. The system of the present invention provides a one piece foundation to which the article is attached, and includes a weatherproof flashing member which is rotatably connected to a upright mounting stanchion. A single lag bolt attaches the system to the structural member of the roof, thereby minimizing the possibility of leaks. Some features of the present invention are:
- The present invention attaches to an existing roof without the need to remove, replace, or reseal any of the existing roofing. This reduces the potential for waterproofing failure.
- The fastening hardware that attaches the system to the roof is directly attached through the existing roofing or new roofing to the roofs rafter framing and is not concealed under any existing part of the roof, thereby allowing for the ease of a visual secure installation.
- The stanchion rotates 360 degrees parallel to the plane of the roof, and thus ensures equal integrity of weatherproofing at any angle.
- Because of it's one piece construction, the system of the present invention saves time and labor costs.
- The present invention obviates the need for a sealing agent such as silicone.
- The present invention universally accepts any solar panel mounting hardware.
- The present invention can be either retro-fit onto an existing roof or installed with a new roof
- The size and shape of the flashing of the present invention may be varied to accommodate most types of roofs.
- The height of the stanchion may be varied to change the mounting distance from the plane of the roof.

In accordance with a preferred embodiment of the invention, a system for attaching an article to a roof having shingles disposed on top of a structural member includes a flashing member which is slidably received by the shingles. A stanchion is connected to the flashing member.

In accordance with an aspect of the invention, the stanchion rotates with respect to the flashing member.

In accordance with another aspect of the invention, a coupler connects the stanchion to the flashing member.

In accordance with another aspect of the invention, the flashing member includes as sheet of flashing which has an aperture. The coupler is integral with the flashing member and includes an upstanding sleeve which surrounds the aperture, the sleeve having a distal end. The stanchion has a hole shaped and dimensioned to receive the sleeve. After the sleeve is received by the hole, the distal end of the sleeve is flared to hold the stanchion and the flashing together.

In accordance with another aspect of the invention, the hole in the stanchion has a flared portion to accommodate the flared distal end of the sleeve.

In accordance with another aspect of the invention, a bolt attaches the system to the structural member of the roof, the bolt being received by the hole in the stanchion and the aperture in the flashing and threadably engaging the structural member.

In accordance with another aspect of the invention, a waterproofing plug seals the hole in the stanchion.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is fragmented top plan view of a roof having shingles to which is attached the system of the present invention;

FIG. 2 is an enlarged fragmented cross sectional view along the line 2-2 of FIG. 1;

FIG. 3 is an enlarged fragmented view of area 3 of FIG. 2;

FIG. 4 is an enlarged exploded fragmented perspective view of the system of the present invention;

FIG. 5 is an enlarged fragmented perspective view of the system of the present invention;

FIG. 6 is a top plan view of a flashing member;

FIG. 7 is a side elevation view of the flashing member;

FIG. 8 is an enlarged fragmented view of area 8 of FIG. 6;

FIG. 9 is a side elevation view of FIG. 8;

FIG. 10 is a cross sectional view along the line 10-10 of FIG. 8;

FIG. 11 is a bottom plan view of FIG. 9;

FIG. 12 is an enlarged top plan view of a stanchion;

FIG. 13 is an enlarged side elevation view of the stanchion;

FIG. 14 is an enlarged bottom plan view of the stanchion;

FIG. 15 is an enlarged side elevation view of the stanchion;

FIG. 16 is a top plan view of the flashing member and the stanchion;

FIG. 17 is a side elevation view of the flashing member and the stanchion;

FIG. 18 is an enlarged cross sectional view along the line 18-18 of FIG. 16;

FIG. 19 is an enlarged cross sectional view as in FIG. 18 showing a flared sleeve;

FIG. 20 is an enlarged exploded fragmented perspective view of a second embodiment of the system of the present invention;

FIG. 21 is an enlarged fragmented perspective view of the second embodiment;

DETAILED DESCRIPTION OF THE INVENTION

Figure 22:
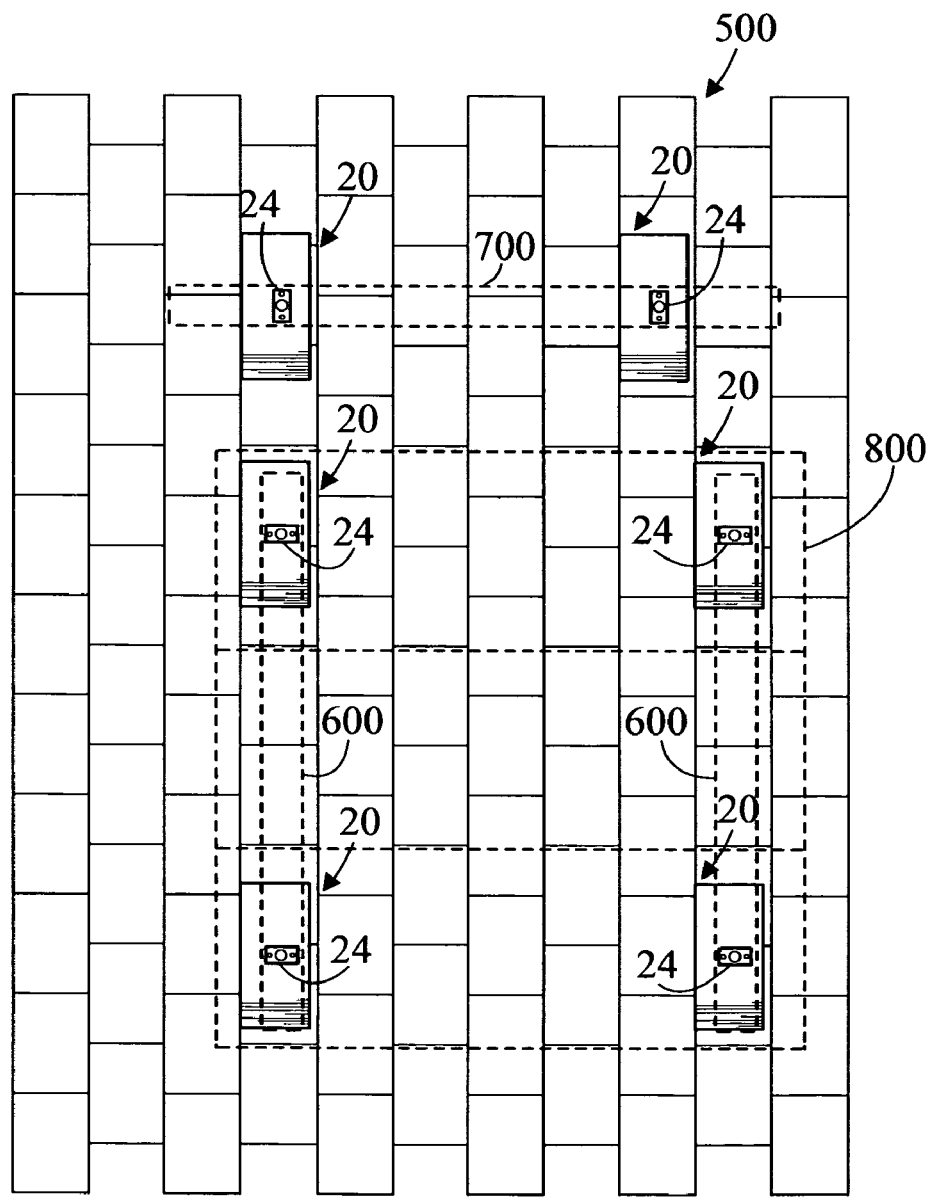
FIG. 22 is a reduced top plan view of the system installed on a roof.

Referring initially to FIGS. 1-5, a system 20 for attaching an article to a roof 500 having shingles 502 disposed on top of a structural member 504, includes a flashing member 22 (also refer to FIGS. 6-11) and a stanchion 24 (also refer to FIGS. 12-15) connected to flashing member 22. Flashing member 22 is slidably receivable by shingles 502 of roof 500. As used herein, the term "slidably receivable by shingles" means that flashing member 22 may be slid up underneath one or more shingles as is depicted in FIGS. 1 and 2. In practice, a thin blade may be used to slightly loosen the shingles 502 prior to sliding flashing member 22 in place beneath shingles 502. FIG. 4 is an enlarged exploded fragmented perspective view of system 20, and FIG. 5 shows system 20 in its installed configuration.

System 20 also includes a bolt 26 for attaching system 20 to structural member 504 (such as a rafter) of roof 500. In the shown embodiment, a covering 505 (such as of plywood) is installed between shingles 502 and structural member 504. Bolt 26 is received by an aperture 28 in flashing member 22 (also refer to FIGS. 6, 8 and 11) and a hole 30 in stanchion 22 (also refer to FIGS. 12 and 14) and threadably engages structural member 504. A pilot hole is drilled through shingles 502 and into structural member 504 to accept bolt 26. A plug 32 made of rubber or the like is provided for sealing hole 30 to prevent water leaks. In the shown embodiment bolt 26 includes both a lag bolt portion 27 for engaging structural member 504 and a threaded post portion 29 for receiving hardware to attach the article to the roof (refer also to FIG. 22). System 20 also includes a washer 34 which engages stanchion 22 and bolt 26.

FIGS. 6-11 show flashing member 22. Flashing member 22 includes a sheet of substantially planar flashing 36 having an aperture 28. In the shown embodiment flashing 36 is an approximate 12 inch by 12 inch square. A coupler connects stanchion 24 to flashing 36.

In the shown embodiment the coupler is integral with (i.e. part of) flashing member 22, and includes an upstanding sleeve 40 which surrounds aperture 28. Upstanding sleeve 40 has a distal end 42. Upstanding sleeve 40 comprises a tube which is oriented perpendicular to flashing 36, and is welded, press fit, or otherwise fixedly and sealingly connected to flashing 36 of flashing member 22. Also, it may be appreciated that the coupler could be integral with stanchion 24 instead of flashing 36, or could be a separate unit.

Referring also to FIGS. 18 and 19, hole 30 in stanchion 24 is shaped and dimensioned to receive sleeve 40. In one embodiment of the invention, when sleeve 40 is received by hole 30, distal end 42 of sleeve 40 is flared to connect stanchion 24 and flashing 36 together (refer to FIG. 19). In another possible embodiment of the invention, stanchion 24 is rotatably attachable to flashing member 22 but not fixedly connected as in FIG. 18. That is, hole 30 removably and rotatably receives sleeve 40.

FIGS. 12-15 depict stanchion 24. Stanchion 24 has a hole 30 for receiving sleeve 40 of flashing member 22 (refer to FIGS. 6-11). Hole 30 has a flared portion 44 to accommodate flared distal end 42 of sleeve 40 (refer also to FIGS. 18 and 19). It may be appreciated that the height of stanchion 24, that is the distance it extends above the plane of the roof's shingles 502 (refer to FIG. 2), may be varied to accommodate various article installation needs.

FIGS. 16 and 17 are top plan and side elevation views respectively of flashing member 22 and stanchion 24. It is noted that stanchion 24 is 360° rotatable with respect to flashing member 22. This rotation feature is useful in that it permits article-attaching hardware to be oriented in any desired direction (refer to FIG. 22 and the associated discussion).

FIG. 18 is an enlarged cross sectional view along the line 18-18 of FIG. 16 showing how hole 30 in stanchion 24 receives sleeve 40 of flashing member 22. In this embodiment, stanchion 24 rotatably engages sleeve 40 of flashing member 22, and stanchion 24 is rotatably but not fixedly connected to flashing member 22. The coupler (sleeve 40) is integral with flashing member 22 and effects the rotation of stanchion 24 with respect to flashing member 22.

FIG. 19 is an enlarged cross sectional view as in FIG. 18, however in this embodiment distal end 42 of sleeve 40 is flared so that stanchion 24 and flashing member 22 are fixedly connected together.

The position of stanchion 24 and flashing member 22 as shown in FIGS. 18 and 19, in combination with plug 32 (refer to FIG. 3), effects a water tight seal of system 20.

FIG. 20 is an enlarged exploded fragmented perspective view of a second embodiment of system 20. This embodiment is similar to that of FIG. 3, however bolt 26 only includes lag bolt portion 27. Connection for receiving hardware to attach the article to the roof is effected by two threaded holes 46. FIG. 21 is an enlarged fragmented perspective view of the second embodiment in its installed configuration.

FIG. 22 is a reduced top plan view of system 20 installed on a roof 500 having shingles 502. In the shown installation, a plurality of systems 20 are connected as shown in FIGS. 1 and 2 to roof structural members in spaced-apart relationship (also refer to FIGS. 1 and 2). The structural members could be one or more rafters or a solid roof covering. Carrier rails 600 and 700 are then connected to adjacent systems 20. An article such as a solar panel 800 is then connected to carrier rails 600. It is noted that stanchion 24 can be rotated a full 360° parallel to the plane of the roof so that the carrier rails can be oriented in a desired direction. As shown, carrier rails 600 are perpendicular to carrier rails 700.

Figure 23:
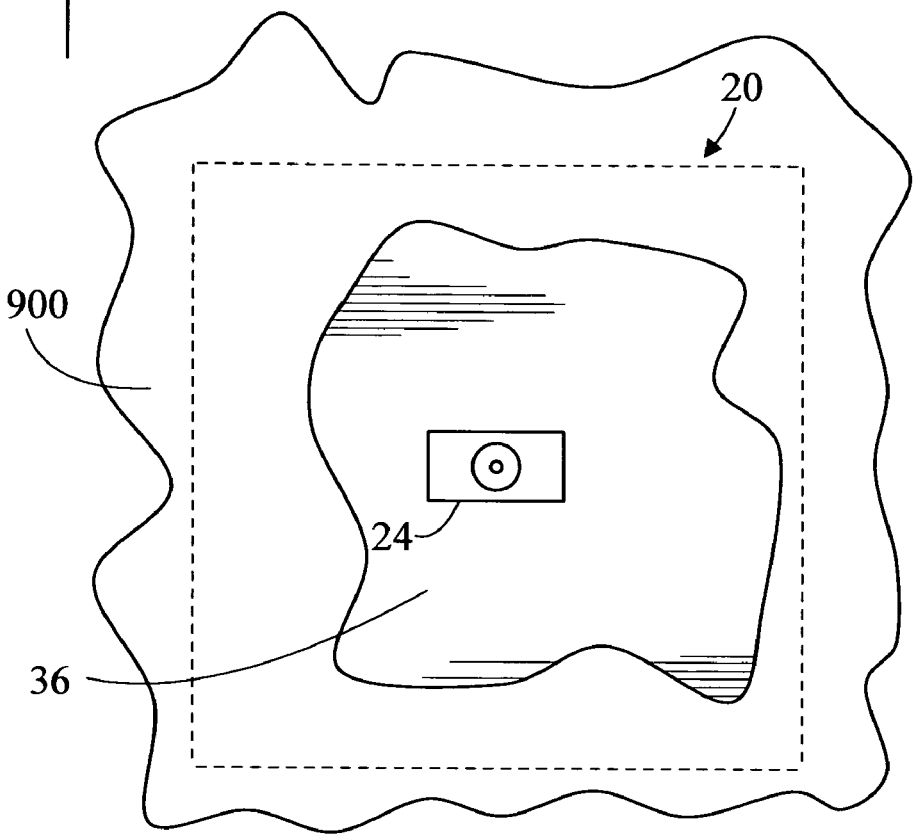
FIG. 23 is a top plan view of an alternate installation configuration.

FIG. 23 is a top plan view of an alternate installation configuration. In this embodiment, system 20 is not slipped between shingles 502 as in FIGS. 1 and 2. Rather, system 20 is simply connected to a flat roof and a sealant 900 (such as tar) is applied around system 20 to ensure a water tight seal. It is also noted that in this embodiment stanchion 24 is substantially centered on flashing 36, as opposed to being offset toward an edge.

In terms of use, a method for attaching an article to a roof includes:

(a) providing a roof 500 having shingles 502 disposed on top of a structural member 504;

(b) providing an article 800;

(c) providing a system 20 for attaching article 800 to roof 500, the system including;

a flashing member 22;

a stanchion 24 connected to flashing member 22; and, flashing member 22 slidably receivable by shingles 502 of roof 500;

(d) sliding flashing member 22 under at least one shingle 502;

(e) attaching system 20 to structural member 504; and, (f) attaching article 800 to stanchion 24.

The method further including:

in step (c), stanchion 24 being rotatable with respect to flashing member 22; and, before step (e), rotating stanchion 24 to a desired orientation.

The method further including:

in step (c), flashing member 22 including flashing 36 having an aperture 28;

in step (c), stanchion 24 having a hole 30;

in step (c), providing a bolt 26 for attaching system 20 to structural member 504 of roof 500, bolt 26 receivable by hole 30 in stanchion 24 and aperture 28 in flashing 36; and, in step (e), using bolt 26 to threadably engage structural member 504 of roof 500.

The method further including:

in step (c), providing a plug 32 for sealing hole 30 in stanchion 24; and, during step (e), inserting plug 32 in hole 30.

The method further including:

in step (e), attaching a plurality of systems 20 to roof 500 in spaced apart relationship.

The method further including:

in step (e), drilling a pilot hole through shingles 502 and into structural member 504.

The preferred embodiments of the invention described herein are exemplary and numerous modifications, variations, and rearrangements can be readily envisioned to achieve an equivalent result, all of which are intended to be embraced within the scope of the appended claims.

We claim:

1. A system for attaching an article to a roof having shingles disposed on top of a structural member, said system comprising:
    a sheet of flashing having an aperture;
    an upstanding sleeve connected to said sheet of flashing, said sleeve completely surrounding said aperture;
    a stanchion connected to said sheet of flashing;
    said stanchion having a hole which is shaped and dimensioned to receive said sleeve;
    said sheet of flashing slidable underneath the shingles of the roof without the need to remove the shingles;
    said sleeve having a circular distal end; and,
    said circular distal end of said sleeve being flared to hold said stanchion and said sheet of flashing together.

2. The system according to claim 1, further including:
    said hole in said stanchion having a flared portion to accommodate said flared distal end of said sleeve.

3. A system for attaching an article to a roof having shingles disposed on top of a structural member, said system comprising:
    a sheet of flashing having an aperture;
    an upstanding sleeve connected to said sheet of flashing, said sleeve completely surrounding said aperture;
    a stanchion connected to said sheet of flashing;
    said stanchion having a hole which is shaped and dimensioned to receive said sleeve;
    said sheet of flashing slidable underneath the shingles of the roof without the need to remove the shingles;
    said stanchion 360° rotatable about said sleeve;
    said sleeve having a circular distal end;
    said circular distal end of said sleeve being flared to hold said stanchion and said sheet of flashing together;
    said hole in said stanchion having a flared portion to accommodate said flared distal end of said sleeve;
    said sleeve being cylindrical;
    said sheet of flashing having a center; and,
    said stanchion offset from said center of said sheet of flashing.

* * * * *